United States Patent [19]
Goldschmidt

[11] 3,949,244
[45] Apr. 6, 1976

[54] REFERENCE SIGNAL GENERATOR FOR TAPE TENSION SERVOMECHANISM

[75] Inventor: Arthur Marvin Goldschmidt, Moorestown, N.J.

[73] Assignee: RCA Corporation, New York, N.Y.

[22] Filed: Mar. 12, 1975

[21] Appl. No.: 557,533

[30]    Foreign Application Priority Data
   Mar. 14, 1974   United Kingdom............... 11433/74

[52] U.S. Cl. ................ 307/265; 307/228; 307/246; 307/294; 242/191
[51] Int. Cl.² ....................... H03K 1/18; H03K 4/08
[58] Field of Search .......... 307/265, 266, 267, 293, 307/294, 228, 246; 242/189–191

[56]         References Cited
         UNITED STATES PATENTS

| | | | |
|---|---|---|---|
| 3,299,288 | 1/1967 | McDowell....................... | 307/294 X |
| 3,548,318 | 12/1970 | Yorksie........................... | 307/294 X |
| 3,800,167 | 3/1974 | Smith.............................. | 307/265 |
| 3,812,383 | 5/1974 | Scheinberg .................... | 307/228 |
| 3,838,319 | 9/1974 | Hammarlund et al. ............. | 307/294 |
| 3,876,889 | 4/1975 | Kawasaki ....................... | 307/228 X |

*Primary Examiner*—John S. Heyman
*Attorney, Agent, or Firm*—Eugene M. Whitacre

[57]         ABSTRACT

A tape tension control system for a video tape recorder in which a first motor is coupled to a supply reel, a second motor is coupled to a takeup reel and a capstan is provided for driving the tape between supply and takeup reels in a normal running mode. Tachometers are associated with each reel and with the capstan. Signal processing circuits are provided for indirectly sensing diameters of tape on the respective reels. The required torque of each motor is determined by comparing the signals representing tape diameter with a reference sawtooth waveform. The sawtooth waveform is provided across a first capacitor coupled via a first transistor switching means to a source of charging current. A second capacitor is coupled to the current source for biasing the transistor into conduction after a predetermined time delay. A biasing supply is coupled to the alternating voltage source for varying the time delay in response to variations in the alternating voltage. Further switching means are coupled to the first and second capacitors for periodically discharging the capacitors in synchronism with the alternating voltage.

6 Claims, 3 Drawing Figures

REFERENCE SIGNAL GENERATOR FOR TAPE TENSION SERVOMECHANISM

This invention relates to magnetic tape video signal recording systems and, in particular, to a reference signal generating arrangement for use in the tape tension servo portion of such recording systems.

In a concurrently filed application, U.S. Pat. application Ser. No. 557,534 filed Mar. 12, 1975 of A. M. Goldschmidt, W. A. Dischert and J. R. West, a tape tension servo system is described in which the tape is normally driven by a capstan operated at substantially constant rotational velocity. A controllable torque is applied to each of supply and takeup reels so as to maintain substantially constant tension in the tape as it passes by the recording (or playback) station. In the normal run mode of the system, holdback torque is applied to the supply reel by a first motor energized in a direction to resist payout of the tape. A second motor coupled to the takeup reel is energized in a direction to aid the tape travel. The energization of each motor is varied continuously according to the diameter of tape on each reel so as to maintain substantially constant tension on the tape throughout its length. When the apparatus is switched to fast-forward (or forward "wind") operation, the capstan is disengaged, the takeup reel motor serves to drive the tape at a rapid rate and the supply reel motor continues to provide controlled holdback torque. When the apparatus is switched to a rewind mode (also a fast mode), the capstan again is disengaged from the tape while energization of the supply and takeup reel motors is maintained in the same direction as for forward run. However, in this situation, the takeup reel motor provides holdback torque, while the supply reel motor energization is appropriate to pull the tape back onto the supply reel. In a "start" operating mode, both reel motors initially are energized so as to drive the tape in the forward direction, the combination of two reel motors and the capstan drive serving to bring the tape rapidly up to running speed. The supply reel motor energization is thereafter switched to provide holdback torque as noted above.

In such systems, the appropriate amount of energization is provided to each reel by controlling the firing angle of one or more triac devices coupled between the motor windings and the alternating current power line and thereby controlling the energization of the motors. The appropriate firing angle is determined by comparing a direct voltage representative of the diameter of tape on each reel with a reference sawtooth waveform which recurs at twice the power line frequency. When the tape diameter is large, a relatively low direct voltage is provided for comparison with the increasing sawtooth waveform. A small tape diameter results in a relatively large direct voltage output. In the former case, the firing angle of the triac(s) occurs relatively early in each cycle of the line voltage, thereby providing relatively high torque while in the latter case, the firing angle occurs later and lower torque is produced.

In systems of the type described above, the relationship between torque and tape diameter will be dependent upon the amplitude of the alternating line voltage available for driving the motors. As a result, the tension maintained in the tape will also be subject to fluctuations as a function of line voltage variations.

In accordance with the present invention, a reference waveform generating circuit is provided in which a repetitive sawtooth voltage waveform is produced in timed relationship with an alternating line voltage waveform. Each repetition of the sawtooth voltage waveform is delayed in time with respect to the zero axis crossovers of the line voltage waveform. The delay is controllable as a function of the amplitude of the line voltage in a manner to maintain the desired substantially constant tape tension despite line voltage amplitude variations. In addition, manual adjusting means is provided for altering the delay to provide a desired tape tension.

The various aspects of the invention, both as to its implementation and method of operation, will best be understood from the following description when read in connection with the accompanying drawings, in which.

Figure 1:
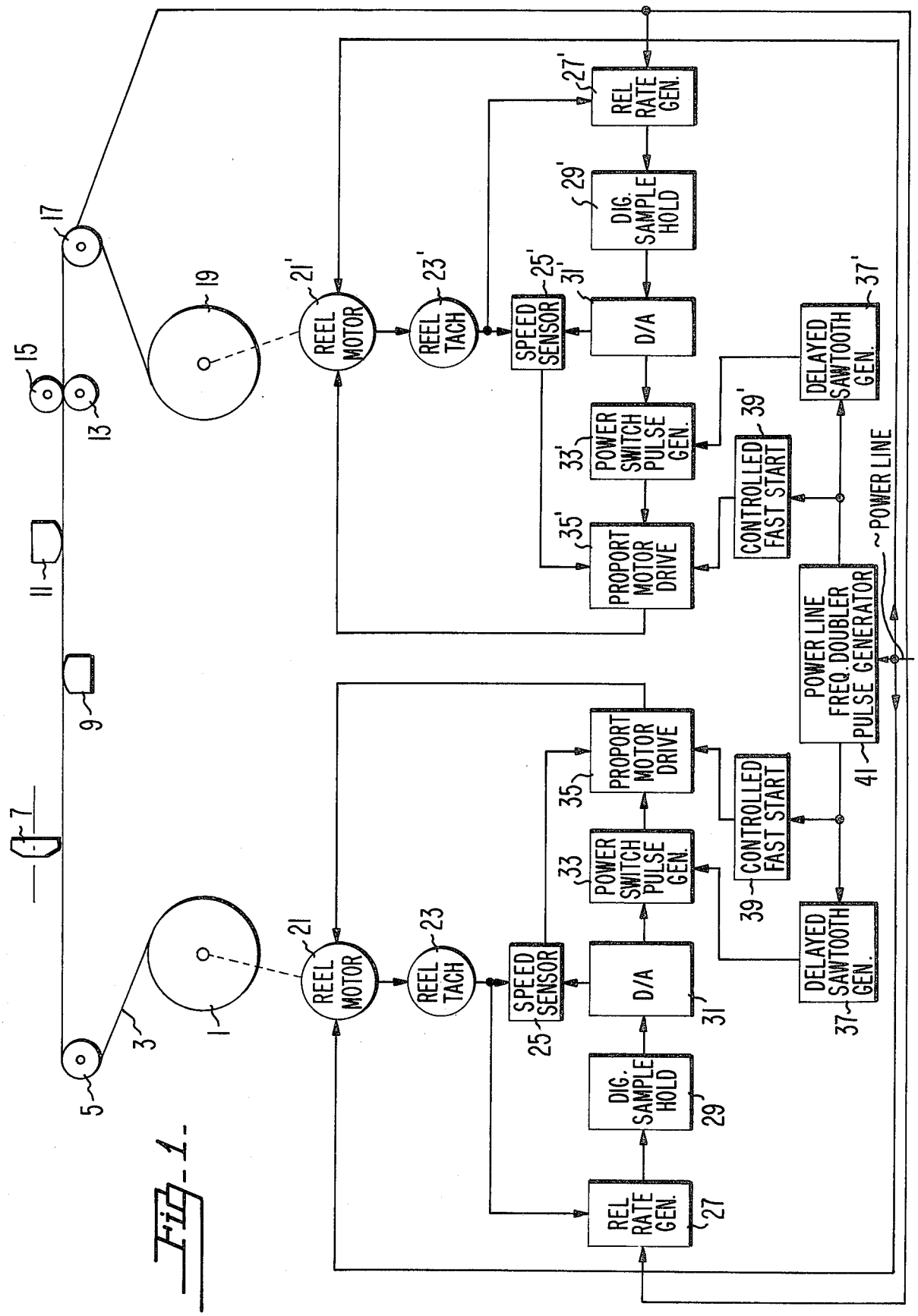
FIG. 1 is a diagrammatic representation of a tape drive system for a video tape recorder suitable for use of the present invention.

Referring to FIG. 1, the apparatus shown there is described in detail in the above-referenced concurrently filed application, the disclosure of which is herein incorporated by reference. A brief description of a portion of the apparatus of FIG. 1 will be provided to aid in understanding the present invention.

The magnetic tape 3 is driven by means of a capstan 13 and pinch roller assembly 15 along a path from a supply reel 1 to a takeup reel 19. A turn-around roller and an associated tape tachometer 17 are positioned between capstan 13 and takeup reel 19. Tachometer 17 is arranged to measure the linear velocity of tape 3. Reel motors 21 and 21' coupled to supply and takeup reels 1 and 19, respectively, are controllably energized to maintain desired constant tension on tape 3 in the normal run mode and to drive the tape 3 directly in fast-wind and rewind modes of operation. Takeup reel motor 21' is always energized to run in a direction corresponding to counterclockwise rotation of takeup reel 19, thereby providing forward pull tension on tape 3 in the forward running modes and providing holdback tension on tape 3 in the reverse wind mode of operation. Supply reel motor 21, on the other hand, is energized in one sense to provide holdback tension during normal run and forward wind (fast) operation and to pull the tape 3 onto reel 1 in the reverse wind mode. Energization of motor 21 is reversed to the opposite sense by means of a controlled fast-start circuit 39 during a start-up mode of operation to permit rapid acceleration of tape 3 to running speed.

Since substantially all elements of the system associated with takeup reel 19 are found in the system associated with supply reel 1, only the latter will be described further.

The diameter of tape 3 on supply reel 1 is sensed indirectly by means of a reel tachometer 23, tape tachometer 17 and a relative rate generator 27. The relative rate generator 27 includes a seven stage digital counter or register to which output pulses produced by tape tachometer 17 are supplied. The seven stage register provides a counting window for 127 consecutive ones of the pulses supplied by tape tachometer 17.

Appropriate reset and readout (strobe) pulses are produced in the interval following the 127th pulse and prior to each 128th pulse. The counting window is utilized to sense the output of reel tachometer 23 on a relatively continuous basis, while the strobe pulse is used to transfer the latter output to a digital sample and hold circuit 29. The information stored in sample and hold circuit 29 is converted to an analog voltage level by means of a digital-to-analog converter 31. This voltage level will be relatively low when the output of relative rate generator 27 is low. This corresponds to a condition where the diameter of tape on supply reel 1 is relatively large (reel 1 rotates relatively slowly). On the other hand, the analog voltage level output of D/A converter 31 will be relatively large when the diameter of tape on reel 1 is relatively small.

Energization of supply reel motor 21 is controlled in response to a comparison of the analog voltage output of D/A converter 31 with a periodic reference sawtooth waveform provided by a delayed sawtooth generator 37. Sawtooth generator 37 is operated in synchronism with the alternating power line voltage waveform (e.g., 60 Hertz) and, in particular, is arranged to provide recurring sawtooth waveforms at twice the power line frequency. The requisite timing information is provided to sawtooth generator 37 by means of a power line frequency doubler and pulse generator circuit 41.

Figure 2:
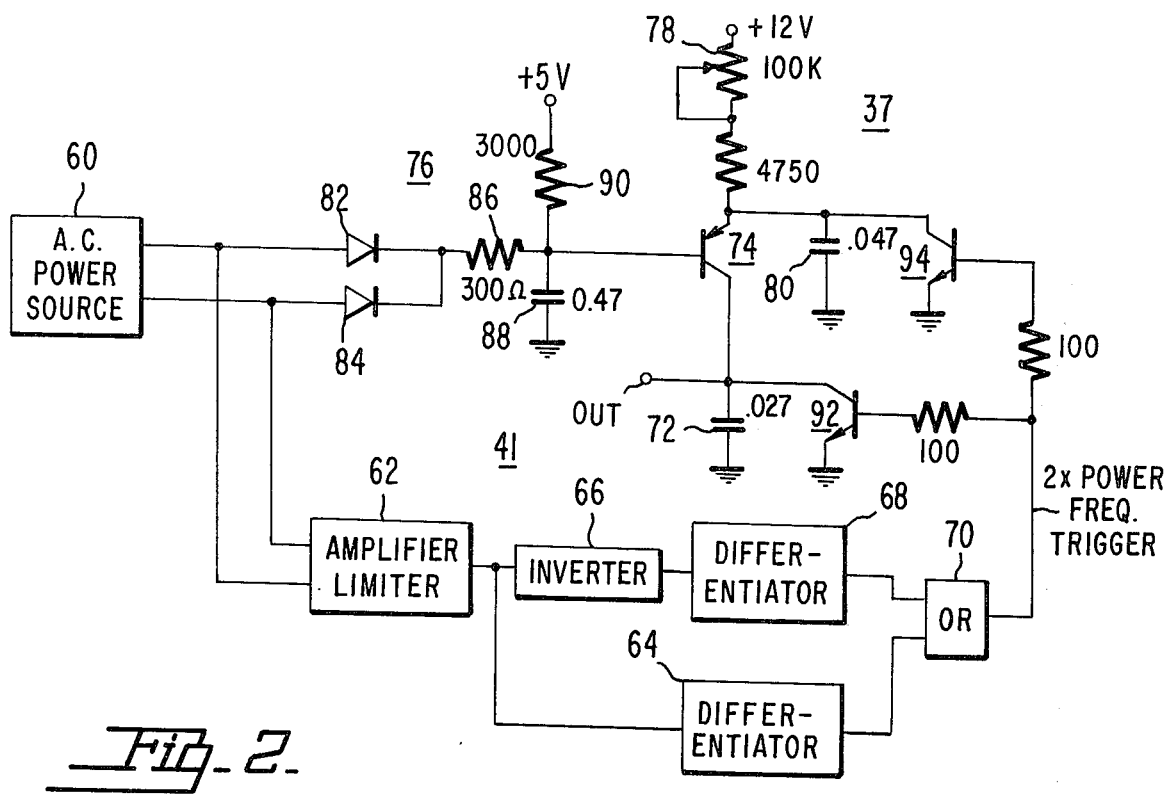
FIG. 2 is a schematic diagram, partially in block form, of a reference signal generator constructed in accordance with the present invention.
Figure 3:
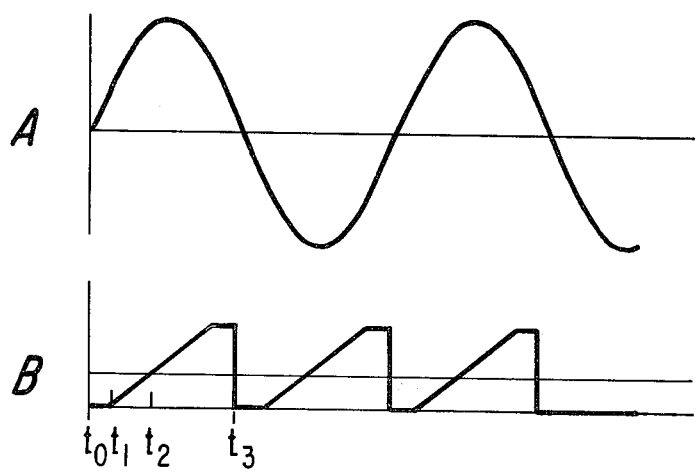
FIG. 3 is a series of waveform diagrams associated with the apparatus of FIGS. 1 and 2.

Referring to FIG. 2, the power line frequency doubler 41 and sawtooth generator 37 are shown in greater detail. The alternating current (A.C.) power line source 60, which provides a substantially sinusoidal voltage waveform (FIG. 3A) at, for example, a 60 Hertz rate, is coupled to an amplifier-limiter circuit 62. In the arrangement illustrated, source 60 preferably includes a center-tapped step-down transformer arranged to provide 12.6 volts output. Amplifier-limiter circuit 62 converts the sinusoidal waveform to a substantially square wave in which the zero axis crossings are maintained in timed relation with respect to those of the line voltage waveform. The square wave output of amplifier-limiter 62 is coupled directly to a first differentiation circuit 64 and via an inverter 66 to a second differentiation circuit 68. Differentiators 64 and 68 provide positive pulses at each positive-going zero crossing and negative pulses at each negative-going zero crossing of their respective applied square waves. Because of the presence of inverter 66, the positive pulse outputs of differentiator 64 are coincident with negative pulse outputs of differentiator 66. These pulse trains are applied to an OR circuit 70 which serves to produce positive pulses from each negative pulse of each train. Thus, the output of OR circuit 70 includes a series of positive pulses at twice the power line frequency (e.g., 120 Hertz) in time coincidence with the zero axis crossings of the power line waveform (FIG. 3A).

The trigger pulse output of OR circuit 70 is utilized to recycle sawtooth waveform generator 37, the desired sawtooth waveform (waveform 3B) being produced across a first capacitor 72. Capacitor 72 is charged periodically by means of a controllable current source comprising a PNP transistor 74 having a base electrode coupled to a first reference voltage source indicated generally by the numeral 76, an emitter electrode coupled via a variable resistance 78 to a source of direct voltage (+12 V) and a collector electrode coupled to capacitor 72. A second capacitor 80 is connected between the emitter of transistor 74 and ground and provides a means for delaying the start of the sawtooth waveform relative to the zero axis crossings of the line voltage waveform (waveform 3A) as will be explained below.

The reference voltage source 76 provides a means responsive to variations in line voltage amplitude for varying the delay associated with the sawtooth waveform. Specifically, voltage source 76 comprises first and second rectifiers 82 and 84 coupled to A.C. power source 60, a series resistor 86 and a shunt filter capacitor 88 across which a direct voltage is produced which varies in amplitude directly with variations in the line voltage amplitude.

A second source of direct voltage (+5 V) is also coupled via a resistor 90 to the base electrode of transistor 74.

First and second switching means comprising grounded emitter transistors 92 and 94 are coupled, respectively, across capacitors 72 and 80 and are responsive to the pulse output of OR circuit 70 for discharging capacitors 72 and 80.

The operation of the arrangement of FIG. 2 will be considered starting at a time interval when capacitors 72 and 80 are discharged to zero volts. In that case, capacitor 88 will be charged to approximately five volts and transistor 74 will be biased to cutoff. Capacitor 80 begins charging via resistor 78 towards the associated voltage (+12 V). When the voltage at the emitter of transistor 74 is sufficiently positive relative to the base voltage (e.g., one $V_{be}$ above the base), transistor 74 will commence conducting and will charge sawtooth capacitor 72 with a substantially constant current (see time $t_1$ in waveform 3B). Capacitor 72 will charge to a voltage level approximately equal to the base voltage of transistor 74. Capacitors 72 and 80 remain charged until the succeeding trigger pulses supplied to transistors 92 and 94, at which time ($t_3$ in waveform 3B) both capacitors again discharge substantially to zero. The cycle is repeated at a rate twice the power line frequency.

Adjustment of the resistor 78 changes the charging rate of capacitor 80 and thereby changes the delay interval ($t_0$ to $t_1$) associated with the sawtooth waveform. Furthermore, variations in amplitude of the voltage derived from power source 60 via rectifiers 82 and 84 will be reflected directly in the voltage across capacitor 88. Thus, if line voltage should decrease from a nominal value, the voltage across capacitor 80 will decrease proportionally. As a result, the emitter-base junction of transistor 74 will be forward biased at an earlier time, causing the initiation of the upward sloping portion of the sawtooth waveform to be earlier (i.e., shifted to the left of $t_1$ in FIG. 3). Similarly, increases of line voltage will cause the beginning of the sawtooth to shift to the right (later) relative to the line voltage zero axis crossings.

In the system of FIG. 1, the shifting of the sawtooth waveform to the left (earlier) has the effect of supplying energizing voltage to supply reel motor 21 during a greater portion of the line voltage waveform while shifting the sawtooth to a later time reduces the duration of energization of the motor 21. This effect is realized in the system of FIG. 1 in the following manner. Power switching pulse generator 33 (FIG. 1) is supplied with the analog voltage output of D/A converter 31 (represented by the voltage level V in waveform 3B) and with the sawtooth waveform provided by generator 37. When the two voltages are equal (at time $t_2$), power switching pulse generator 33 supplies a trigger pulse to a motor drive circuit 35 employing, for example, a bidirectional triac control arrangement. That portion of the power line waveform 3A occuring between the time $t_2$ and the following zero axis crossover is then applied to motor 21. It can be seen, therefore, that as the sawtooth waveform 3B shifts to the left (earlier), the motor 21 will be energized for a longer portion of each cycle of the line voltage. Thus, when line voltage decreases, the sawtooth begins earlier and although the maximum amplitude of the line voltage supplied to motor 21 decreases, the duration of energization is increased. In this manner, a relatively constant torque is provided by the motor and tape tension is maintained despite line voltage variations. By a similar analysis, it can be seen that increases in line voltage are compensated by the sawtooth shifting to a later portion of the cycle.

Adjustment of the resistor 78 (FIG. 2), as mentioned above, changes the delay of the sawtooth waveform, thereby changing the firing angle associated with the drive to motor 21 for a given output from D/A converter 31. The resultant change in torque supplied by motor 21 will change the tension in the tape 3.

As noted above, the delayed sawtooth generator 37' associated with takeup reel 19 is arranged and operates in substantially the same manner as sawtooth generator 37.

Various modifications may be made to the particular circuit arrangement illustrated without departing from the scope of the present invention which is set forth in the appended claims.

What is claimed is:

1. In a tape tension control system for a video tape recorder wherein at least a first motor is coupled to a first tape reel, means are provided for producing an electrical signal representative of the diameter of tape on said reel, and a controllable energizing supply responsive to an alternating voltage source is coupled to said motor for varying torque supplied by said motor as a function of said diameter of tape, a reference sawtooth waveform signal generator comprising:

a first capacitor,
a source of charging current for said capacitor, and
switching means for coupling said first capacitor to said source, said switching means comprising a first transistor having an output terminal coupled to said first capacitor and first and second input terminals, a second capacitor coupled to said current source and to said first input terminal and responsive to said charging current for biasing said transistor into conduction after a predetermined time delay, a biasing supply coupled to said alternating voltage source and to said second input terminal for varying said time delay in response to variations in said alternating voltage, and switching means coupled to said first and second capacitors for periodically discharging said capacitors in synchronism with said alternating voltage.

2. Apparatus according to claim 1 wherein:
said biasing supply comprises rectifying and filtering means coupled to said alternating voltage source for producing a direct voltage having an amplitude responsive to variations in the amplitude of said alternating voltage, said biasing means and charging of said second capacitor determining said time delay.

3. Apparatus according to claim 2 wherein:
said output and said first and second input terminals correspond, respectively, to collector, emitter and base electrodes of said transistor.

4. Apparatus according to claim 2 wherein:
said biasing supply direct voltage is of a polarity to bias said first transistor to a cutoff condition.

5. Apparatus according to claim 4 wherein:
said source of charging current comprises a resistor and a voltage supply of a polarity to bias said first transistor to a conductive condition.

6. Apparatus according to claim 5 wherein:
said resistor is a variable for controllably varying said time delay.

* * * * *